United States Patent [19]
Schindler et al.

[11] 3,745,568
[45] July 10, 1973

[54] SPECTRUM ANALYSIS RADAR

[75] Inventors: John K. Schindler, Chelmsford; F. Sheppard Holt, Winchester, both of Mass.

[73] Assignee: The United States of America as represented by the Secretary of the Air Force, Washington, D.C.

[22] Filed: Apr. 11, 1972

[21] Appl. No.: 242,996

[52] U.S. Cl. .................................. 343/5 SA, 343/9
[51] Int. Cl. ............................................. B01s 9/44
[58] Field of Search ..................... 343/5 SA, 9, 18 E

[56] References Cited
UNITED STATES PATENTS
3,603,990   9/1971   Poirier ............................. 343/5 SA
3,680,100   7/1972   Woerrlein ....................... 343/18 E Primary Examiner—Benjamin A. Borchelt
Assistant Examiner—G. E. Montone
Attorney—Harry A. Herbert, Jr. et al.

[57] ABSTRACT

Noise source signals are added to their reflected signals and bandpass filtered in a comb filter having a sequence of frequency outputs which are pair-wise mixed and fed into a sequence of phase shifters with each phase shifter having a sequential linearly progressive phase shift. The outputs of the phase shifters are fed to a matrix including alternate sequences of phase shifters with linearly progressive phase shifts and the phase shifters are interconnected in pairs with 90° hybrid junctions. Detectors are fed by the outputs of the matrix producing range gate outputs.

2 Claims, 1 Drawing Figure

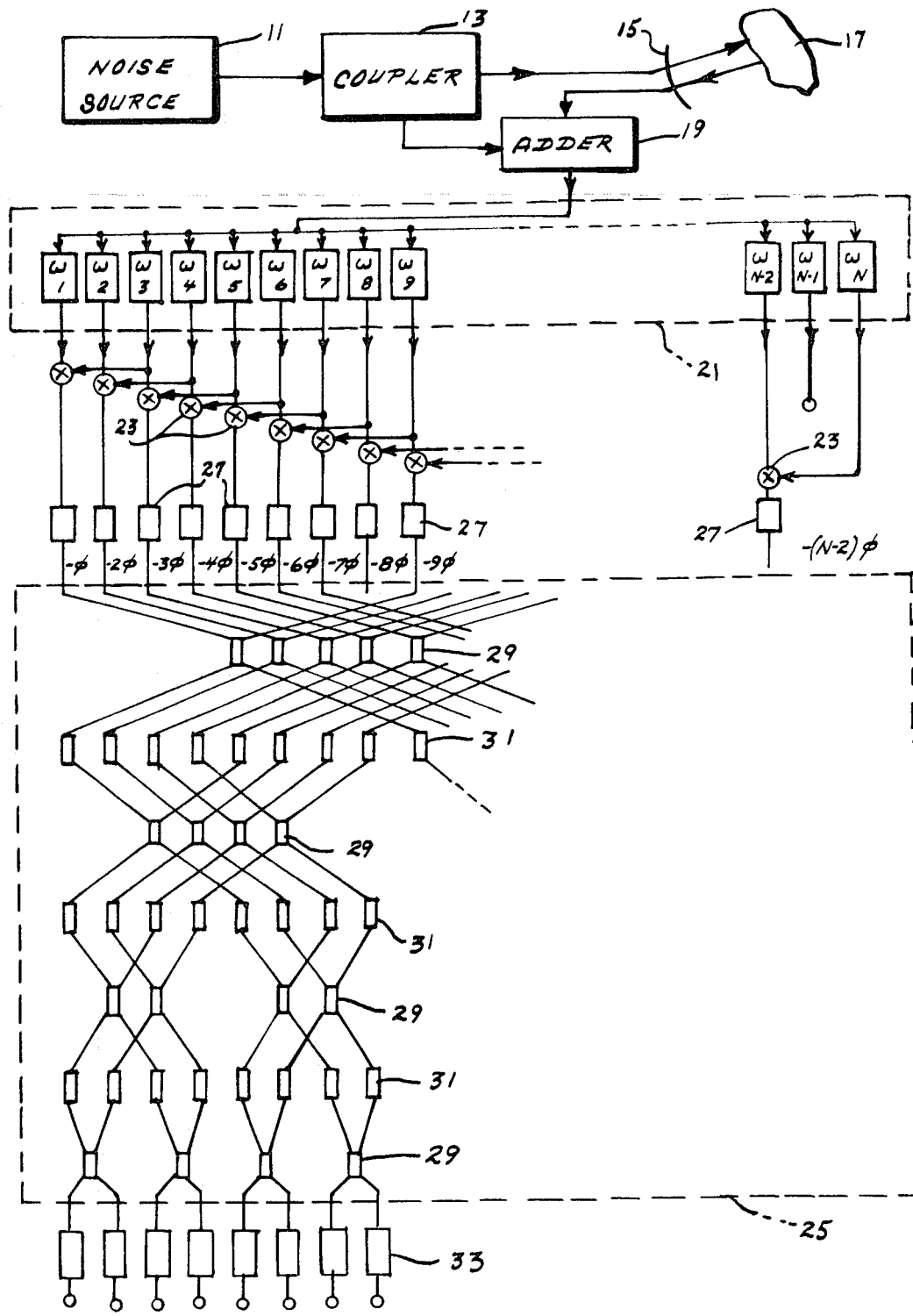

SPECTRUM ANALYSIS RADAR

BACKGROUND OF THE INVENTION

This invention relates to spectrum analysis radar, and particularly to a system for obtaining simultaneous measurement of target range and radial velocity.

The spectrum analysis radars used in the past can not measure the speed of a target or measure the range of targets moving with even modest velocities, and these restrictions seriously limit the scope of useful application of the radar. This invention however, removes these restrictions and offers a method of simultaneously measuring both the range and the radial speed of a target. In addition, the inherent self noise suppression used in this invention increases the radar's effective range and sensitivity.

SUMMARY OF THE INVENTION

This invention presents a signal processing technique for the spectrum analysis radar which permits simultaneous measurement of target range and radial velocity. A sum signal is formed by adding the reflected signal from the target and the reference signal as in the conventional spectrum analysis radar. The sum signal is then passed through a comb filter and successive filter outputs are sent pair-wise to balanced mixers. The center frequencies of the filter pairs are separated by the expected doppler frequency of the target return. The outputs from successive balanced mixers are properly phased in a low frequency Butler matrix structure to determine the range of the target.

It is therefore an object of the invention to provide a novel and improved spectrum analysis radar.

It is another object to provide a spectrum analysis radar that can simultaneously detect and measure targets at large range and high velocities.

It is still another object to provide a spectrum analysis radar that suppresses self noise inherent in conventional CW spectrum analysis radar.

These and other objects, features and advantages of the invention will become more apparent from the following description taken in connection with the illustrative embodiment in the accompanying drawing.

DESCRIPTION OF THE DRAWING

The sole FIGURE is a block diagram showing an embodiment of the invention.

DETAILED DESCRIPTION OF THE PREFERRED EMBODIMENT

Referring to the FIGURE, a noise signal from RF noise source 11 is split into two portions by directional coupler 13. One portion is radiated from antenna 15 to radar target 17 at range R with radial velocity V. Upon reflection from target 17, the signal is received by antenna 15 where it is added to the signal from the coupler port in adder 19.

Assume that the reference signal from the directional coupler takes the form $$e_{ref} = \alpha A(t) \cos(\omega_o t + \phi(t))$$

where $\omega_o = 2\pi f_o$ = center frequency of the radar;
$A(t)$, $\phi(t)$ = random amplitude and phase modulation of the radar emission, and
$\alpha$ = scale factor.
Further, the return signal is time delayed and doppler shifted.

$$e_{return} = \beta A(t - \tau) \cos(\omega_o(t - \tau) + \omega_D(t-\tau) + \phi(t-\tau))$$

$\tau$ = time delay = $2R/C$ $\omega_D$ = doppler frequency = $2V\omega_{o/C}$ and $\beta$ = scale factor to account for the change in signal strength due target range and reflection.

The signal from the adder 19 is the sum of the reference and return signals. The sum signal is then passed through comb filter 21. This filter consists of a sequence of identical narrow bandwidth filters having center frequencies $\omega_1, \omega_2 \ldots \omega_N$ adjusted to minimize the common pass band between adjacent filters. The bandwidth of each filter is given by $2\omega_B$. Because high Q factor filters may be required, the comb filtering might best be accomplished at some intermediate frequency or as digital I and Q video filters. I and Q channel video signals result from mixing the bandpass signal $C(t) \cos(\omega_o t + \gamma(t))$ with the in phase (I) and quadrature (Q) signals, $\cos \omega_o t$ and $\sin \omega_o t$ respectively, and selecting the low pass video signals $I(t) = C(t) \cos \alpha(t)$ and $Q(t) = C(t) \sin \alpha(t)$.

Alternate pairs of filter outputs are sent to the input terminals of balanced mixers 23 where the signals are multiplied together. Assume that each filter pair is specified by the center frequencies of its individual filters, $\omega_p$ and $\omega_q$. The ensemble average signal from a balanced mixer, $\overline{e_m(t)}$, consists of a DC component and a signal component at the doppler frequency, $\omega_D$, of the return signal:

$$\overline{e_m(t)} = D + B \cos(\omega_D t + \omega_p \tau) + C \sin(\omega_D t + \omega_p \tau).$$

The amplitude of the DC component, $D$, is given by $$D = G_n(\omega_p)(\alpha^2 + \beta^2)(\omega_B 3/[(2\omega_B)^2 + (\Delta\omega)^2];$$

where $G_n(\omega_p)$ = power spectral density of the RF noise source 11 and $\Delta\omega = \omega_p - \omega_q$. The assumption of simple first order pole bandpass filters has been made here, but is not an essential assumption.

Component D contains no information regarding target range and velocity. This signal component is thus referred to as self noise since it serves only to degrade the range-doppler measurement capabilities of the system; i.e., the signal components at frequency $\omega_D$. To reduce the amplitude of this self noise signal component it is required that $2\omega_B \ll \Delta\omega$; the individual filter bandwidth $2\omega_B$ must be small compared to $\Delta\omega$, which, as noted, is the approximate doppler frequency of the target. The reduced amplitude of this self noise component improves the overall sensitivity of the system for detecting long range targets.

The amplitude of the doppler frequency components are given by $$B \approx G_n(\omega_p)\alpha\beta e^{-\omega_B \tau}(\omega_B^3)/[(2\omega_B)^2 + (|\Delta\omega| \pm \omega_D)^2]$$

$$C \approx G_n(\omega_p)\alpha\beta e^{-\omega_B \tau} \omega_B^2 (\Delta\omega - \omega_D)/2 [(2\omega_B)^2 + (|\Delta\omega| \pm \omega_D)^2].$$

Again, the assumption of simple first order pole bandpass filters is implicit in these results. To maximize the amplitude of the doppler frequency components $$\omega_B \tau_{max} \leq 1; \text{ where}$$

$$\tau_{max} = 2R_{max}/C \text{ and}$$

$R_{max}$ = maximum range at which targets are to be observed by the radar and $$[|\Delta\omega| \pm \omega_D] < \omega_B.$$

That is, the separation in filter center frequencies $|\Delta\omega| = |\omega_p - \omega_q|$ must deviate from the expected doppler frequency of the target by less than half the bandwidth of an individual filter. Of course, other targets with different doppler frequencies will not be passed by the comb filter-balanced mixer combination and will go undetected. Thus, doppler resolution of the order $$\Delta V = C\omega_B/\omega_o \text{ is achieved.}$$

The equation defining $e_m(t)$ shows that the phase of the mixer output, $\omega_p\tau$, varies linearly with bandpass filter center frequency, $\omega c_p$. The slope of the linear variation, $\tau$, is proportional to the range to the target. Thus, phase comparison of successive mixer outputs will yield range information about the target with doppler frequency, $\omega_D$. Butler matrix 25 accomplishes this phase comparison.

To fully utilize the capabilities of the processing of the Butler matrix 25 it is necessary to introduce a progressive phase shift by phase shifter 27 to the balanced mixer outputs. The phase increment, $\phi$ is given by $$\phi = \zeta\omega \ [(\tau_{max} + \tau_{min})/2 \ ] \text{ where } \zeta\omega = \text{separation in center frequency of adjacent bandpass filters in 21,}$$

$$\tau_{min} = (2 \ R_{min})/C$$

and $R_{min}$ = minimum range at which targets are to be observed by the radar. The average signals from the phase shifter bank 27 assume the form $$\overline{e_p(t)} = D + B \cos (\omega_D t + \omega_p \tau - p\phi) + C \sin (\omega_D t + \omega_p \tau - p\phi)$$

so that the phase shift of the signals between adjacent channels forms a linear progressive phase shift with slope $$\zeta\omega \ [\tau - [\tau_{max} + \tau_{min}/2]].$$

This slope can be either positive or negative depending upon whether the target delay is larger or smaller than the average delay $$(\tau_{max} + \tau_{min})/2 \ .$$

Butler matrix 25 is a device which accepts $2^n$ input channels having a progressive linear phase shift from channel to channel and which outputs a signal on only one of its $2^n$ output channels. The slope of the linear phase shift, in this case, the range to the target, determines which of the output terminals exhibits the signal. Butler matrix 25 consists of a sequence of 90° hybrids 29 and phase-shifters 31 interconnected. The hybrid is a device which outputs two signals of equal amplitude, one of which is in phase with the input while the other has a 90° phase with the input.

Assuming $\zeta\omega$ denotes the separation in center frequency of adjacent bandpass filters, to adequately sample the phase variation with frequency it is required that $$\zeta\omega \ [(\tau_{max} - \tau_{min})/2 \ ] < \pi/2 \ .$$

Further, $n$ being an integer, bandpass filters must cover the usable bandwidth $B$ of the radar. That is, $$2^n \ \zeta\omega = B_o$$

and so $$2^{-n} \ B_o(\tau_{max} - \tau_{min}) < \pi.$$

This result specifies the number of bandpass filters $2^n$ as well as the necessary size of the Butler matrix. Also, the range resolution achievable is given by $$\Delta\tau = (\tau_{max} - \tau_{min})/2^n < \pi/B_o$$

where of course $$\Delta\tau = 2 \ \Delta R/C \ .$$

If only a portion of the delay $(\tau_{min}, \tau_{max})$ need be instrumented, certain of the Butler matrix outputs and related hybrids and phase shifters may be dropped. Butler matrix designs exist with other than $2^n$ inputs and outputs and so the number of bandpass filters need not be limited to $2^n$. The designs must be accomplished at audio (doppler) frequencies and thus might best be implemented as a special purpose digital computer.

The Butler matrix must also possess sufficient bandwidth to operate over all doppler frequencies to be encountered by the radar.

Finally, the Butler matrix outputs must be detected by either a square law or envelope detector 33 and the result sent to an appropriate display. Each detector output corresponds to a target at a specific range increment $p\Delta\tau, p = 1, 2, \ldots$ $$\Delta\omega \pm \omega_D < \omega_B \ .$$

What is claimed is:

1. A system for determining range and velocity of a target comprising:
   a. a noise source;
   b. a coupler fed by the noise source
   c. an antenna fed by the coupler for transmitting signals to the target and receiving the reflected signals therefrom;
   d. an adder fed by the reflected signals from the antenna and from the coupler;
   e. a comb filter including a plurality of bandpass filters fed by the adder;
   f. a plurality of balanced mixers each fed by alternate pairs of bandpass filters;
   g. a sequence of phase shifters fed by the balanced mixers and shifting the phase by a factor of progressive sequential increments;
   h. a matrix having a plurality of inputs fed by the phase shifters including a plurality of sequences of phase shifters with progressive linear phase shifts and a plurality of sequences of 90° hybrid junctions interconnecting in pairs the sequence of phase shifters; and
   i. a plurality of detectors fed by the outputs of the matrix.

2. A system for determining range and velocity of a target according to claim 1 wherein the plurality of detectors are square law detectors.

* * * * *